United States Patent
Lewis et al.

(10) Patent No.: US 6,624,984 B2
(45) Date of Patent: Sep. 23, 2003

(54) FLY HEIGHT CONTROL SLIDER WITH CROWN AND CROSS CURVE DE-COUPLING

(75) Inventors: Derek A. Lewis, Minneapolis, MN (US); Deborah S. Schnur, Minneapolis, MN (US); Markus E. Mangold, Minneapolis, MN (US); Zine-Eddine Boutaghou, Vandais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 140 days.

(21) Appl. No.: 09/808,462

(22) Filed: Mar. 14, 2001

(65) Prior Publication Data

US 2001/0046108 A1 Nov. 29, 2001

Related U.S. Application Data

(60) Provisional application No. 60/207,463, filed on May 25, 2000.

(51) Int. Cl.$^7$ .............................................. G11B 21/24
(52) U.S. Cl. .................................................... 360/297.1
(58) Field of Search ................. 360/294.7, 234.3–237.1

(56) References Cited

U.S. PATENT DOCUMENTS

| | | |
|---|---|---|
| 3,632,900 A | 1/1972 | Kurzweil, Jr. et al. ... 179/100.2 |
| 4,605,977 A | 8/1986 | Matthews .................... 360/103 |
| 4,734,803 A | 3/1988 | Nishihira .................... 360/103 |
| 5,021,906 A | 6/1991 | Chang et al. ................ 360/103 |
| 5,062,017 A | 10/1991 | Strom et al. ................. 360/103 |
| 5,128,822 A | 7/1992 | Chapin et al. .............. 360/103 |
| 5,196,973 A | 3/1993 | Chapin et al. .............. 360/103 |
| 5,200,868 A | 4/1993 | Chapin et al. .............. 360/103 |
| 5,212,608 A | 5/1993 | Yoneoka ...................... 360/103 |
| 5,287,235 A | 2/1994 | Cunningham et al. ...... 360/103 |
| 5,343,343 A | 8/1994 | Chapin ........................ 360/103 |
| 5,396,386 A | 3/1995 | Bolasna et al. ............. 360/103 |
| 5,396,387 A | 3/1995 | Murray ........................ 360/103 |
| 5,473,485 A | 12/1995 | Leung et al. ................ 360/103 |
| 5,488,524 A | 1/1996 | Cunningham ............... 360/103 |
| 5,490,026 A | 2/1996 | Dorius et al. ............... 360/103 |
| 5,515,219 A | 5/1996 | Ihrke et al. .................. 360/103 |
| 5,625,513 A | 4/1997 | Utsunomiya et al. ....... 360/103 |
| 5,986,850 A | 11/1999 | Wang et al. ................. 360/103 |
| 6,130,807 A | * 10/2000 | Marchon .................... 360/135 |
| 6,246,552 B1 | * 6/2001 | Soeno et al. ............. 360/294.4 |

FOREIGN PATENT DOCUMENTS

| | | |
|---|---|---|
| EP | 0 600 348 A2 | 11/1993 |
| JP | 2-53256 | 2/1990 |
| JP | 3-12854 | 1/1991 |

OTHER PUBLICATIONS

"Programmable Air Bearing Sliders" Vijay D. Khanna et al. IEEE Transactions on Magnetics, vol. 127, No. 6, Nov. 1991.

"Design, Simulation, Fabrication and Measurement of a 25 NM, 50% Slider" S. Lu, et al. IEEE Transactions on Magnetics, vol. 31, No. 6, Nov. 1995.

* cited by examiner

Primary Examiner—A. J. Heinz
Assistant Examiner—Mark S Blouin
(74) Attorney, Agent, or Firm—Westman, Champlin & Kelly, P.A.

(57) ABSTRACT

A slider having a slider body is provided for actively controlling a fly height of the slider relative to a data storage disc. A first plurality of beams are affixed to a back surface of the slider body. The beams are disassociated from one another and are constructed of deformable material. Each beam, in response to an applied electrical control signal is deformable in a first dimension parallel to the back surface of the slider body. Deformation of the first plurality of beams in response to an applied electrical control signal affects slider fly height by changing one of slider body crown and cross curvatures to a greater extent than along the other. In accordance with other embodiments, multiple layers of deformable beams are attached to a slider. In yet other embodiments, piezoelectric material layers having anisotropic properties are substituted for beam layers.

25 Claims, 7 Drawing Sheets

FLY HEIGHT CONTROL SLIDER WITH CROWN AND CROSS CURVE DE-COUPLING

CROSS-REFERENCE TO RELATED APPLICATION

This application claims priority from U.S. Provisional Application No. 60/207,463, filed May 25, 2000, and entitled "FLY HEIGHT CONTROL SLIDER WITH CROWN AND CROSS-CURVE DE-COUPLING".

FIELD OF THE INVENTION

The present invention is related to disc drive data storage systems and, more particularly, to a method of controlling curvature of a transducing head, such as a hydrodynamic bearing slider.

BACKGROUND OF THE INVENTION

Disc drives of the "Winchester" type are well known in the industry. Such drives use rigid discs coated with a magnetizable medium for storage of digital information in a plurality of circular, concentric data tracks. The discs are mounted on a spindle motor, which causes the discs to spin and the surfaces of the discs to pass under respective head gimbal assemblies (HGAs). Head gimbal assemblies carry transducers which write information to and read information from the disc surface. An actuator mechanism moves the head gimbal assemblies from track to track across the surfaces of the discs under control of electronic circuitry. The actuator mechanism includes a track accessing arm and a load beam for each head gimbal assembly. The load beam provides a preload force which urges the head gimbal assembly toward the disc surface.

The head gimbal assembly includes a gimbal and a slider. The gimbal is positioned between the slider and the load beam to provide a resilient connection that allows the slider to pitch and roll while following the topography of the disc. The slider includes a slider body having a bearing surface, such as an air bearing surface, which faces the disc surface. As the disc rotates, the air pressure between the disc and the air bearing surface increases, which creates a hydrodynamic lifting force that causes the slider to lift and fly above the disc surface. The preload force supplied by the load beam counteracts the hydrodynamic lifting force. The preload force and the hydrodynamic lifting force reach an equilibrium which determines the flying height of the slider. The transducer is typically mounted at or near the trailing edge of the slider.

In some applications, the slider flies in close proximity to the surface of the disc. This type of slider is known as a "pseudo-contact" slider, since the bearing surface of the slider can occasionally contact the surface roughness of the disc. In other applications, the slider is designed to remain in direct contact with the disc surface with substantially no air bearing. These sliders are referred to as "contact recording" sliders.

It is often desirable to fabricate a slider such that the bearing surface has a positive curvature along the length and width of the slider. Length curvature is known as crown curvature. Width curvature is known as cross or camber curvature. The proper setting and control of crown and cross curvature reduces flying height variability over varying conditions, improves wear on the slider and the disc surface, and improves takeoff performance by reducing stiction between the slider and the disc surface. In a typical slider fabrication process, crown or cross curvature is created by lapping the bearing surface on a spherically-shaped lapping surface or on a flat lapping surface while rocking the slider body back and forth in the direction of the desired curvature. The amount of curvature is determined by the radius of the rocking rotation. This lapping process is difficult to control and results in large manufacturing tolerances. U.S. Pat. Nos. 5,442,850; 5,266,769; 5,982,583 and 6,073,337 disclose various other methods for setting slider curvature by altering surface stresses in the slider body material during fabrication of the slider body. The curvature of the slider is then fixed after fabrication.

However, as technology evolves and recording density increases, sliders must fly closer to the magnetic surface of the disc to maintain signal strength. Lower fly heights will necessitate tighter tolerances on fly height to avoid head-disc interactions. Currently, as was mentioned above, target fly heights are achieved by precisely controlling the dimensions of the slider (which carries the recording head) during the manufacturing process. In the future, however, manufacturing limits will be reached, and effective methods for adjusting slider geometry after fabrication will be needed. For instance, adjustments could be made before the drive is qualified for service or actively while the slider is flying.

Instead of relying on optimized passive air bearing surfaces and fabricated crown curvatures to control slider fly heights, various approaches to actively controlling slider fly height during operation of a data storage system have been proposed both for recording heads and glide heads. Generally, with prior curvature control methods, each active change in crown curvature results in a corresponding change in cross curvature and vice versa. For example, the properties of piezoelectric deformable material used in active slider actuation typically require changes in crown and cross curvature to be coupled. Crown curvature change is due to expansion or contraction of the deformable material in a longitudinal direction, while cross curvature change is due to expansion or contraction of the deformable material in a transverse direction. The expansion/contraction of the deformable material in the two directions is typically coupled, which results in the coupling of changes in crown and cross curvature.

In many instances, the coupling of changes in crown and cross curvature proves to be disadvantageous because the effects of adjustment in each type of curvature may be opposite in nature, and each could be desirable in certain situations. For example, fly height is positively related to crown curvature and negatively related to cross curvature. In addition, slider fly height is more sensitive to changes in crown curvature than cross curvature, but if cross curvature becomes too high as a result of crown actuation, the roll stability of the slider may be compromised. Conversely, if cross curvature becomes too low (negative), the rails of the slider may contact the disc. Also, it should be considered that crown and cross curvature values for each particular slider can vary from one slider to the next and in different directions based on variances in prior fabrication processes. Therefore, it is desirable to de-couple the actuation of crown and cross curvature as much as possible to enable fly height change to be maximized. It is also desirable to enable actuation of one curvature type preferentially over the other.

An improved method and apparatus are desired for actively controlling slider fly height during operation of the disc drive.

SUMMARY OF THE INVENTION

One aspect of the present invention pertains to a slider for actively controlling a fly height of the slider relative to a data storage disc. The slider includes a slider body having an air bearing surface, a back surface opposite the air bearing surface, a length, a width, a longitudinal axis, a transversal axis, a crown curvature located on the air bearing surface along the length of the slider body and a cross curvature located on the air bearing surface along the width of the slider body. The slider also includes a first plurality of beams that are disassociated from one another, constructed of deformable material and affixed to the back surface of the slider body. Each beam within the first plurality of beams, in response to an applied electrical control signal, is deformable in a first dimension parallel to the back surface of the slider body.

Another aspect of the present invention pertains to a slider for actively controlling a fly height of the slider relative to a data storage disc. The slider includes a slider body having an air bearing surface, a back surface opposite the air bearing surface, a length, a width, a longitudinal axis, a transversal axis, a crown curvature located on the air bearing surface along the length of the slider body and a cross curvature located on the air bearing surface along the width of the slider body. The slider also includes a first layer of deformable anisotropic material affixed to the back surface of the slider body and having a length and width that respectively and substantially coincide with the length and width of the slider body.

Another aspect of the present invention pertains to an apparatus for actively controlling a slider. The apparatus includes a disc rotatable about a central axis and having a recording surface. The apparatus also includes disc head slider means for carrying a transducer at a fly height relative to the recording surface during rotation of the disc and for actively altering at least one of a crown and cross curvature of the disc head slider to a greater extent than the other of the crown and cross curvature to adjust the fly height during rotation of the disc.

DETAILED DESCRIPTION OF ILLUSTRATIVE EMBODIMENTS

Figure 1:
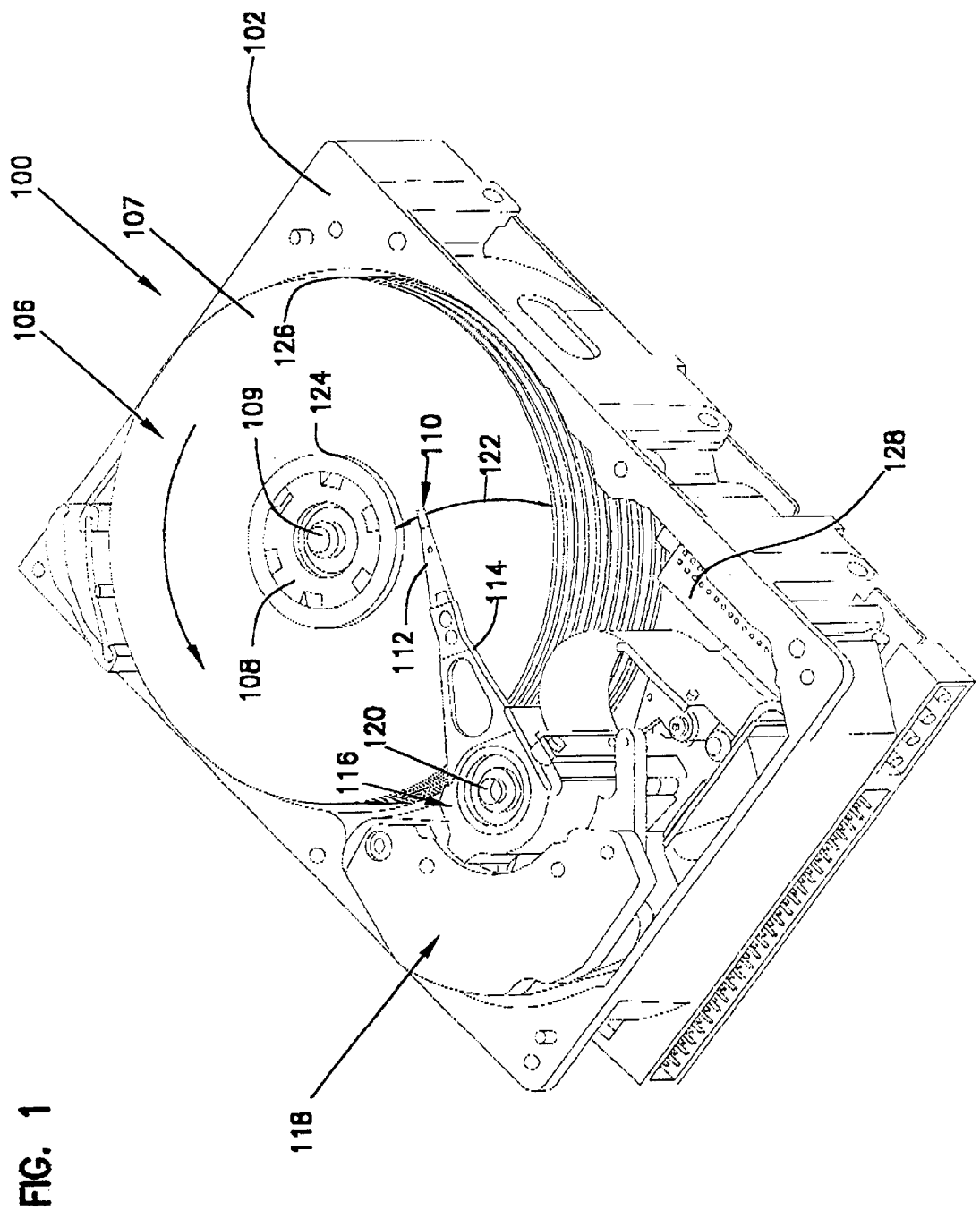
FIG. 1 is a perspective view of a disc drive in which the present invention is useful.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface. The read/write head can include any type of transducing head, such as an inductive head, a magneto-resistive head, an optical head or a magneto-optical head for example.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

During operation, as discs 107 rotate, the discs drag air under the respective sliders 110 and along their air bearing surfaces in a direction approximately parallel to the tangential velocity of the discs. As the air passes beneath the air bearing surfaces, air compression along the air flow path causes the air pressure between the discs and the air bearing surfaces to increase, which creates a hydrodynamic lifting force that counteracts the load force provided by suspensions 112 and causes the sliders 110 to lift and fly above or in close proximity to the disc surfaces.

Figure 2:
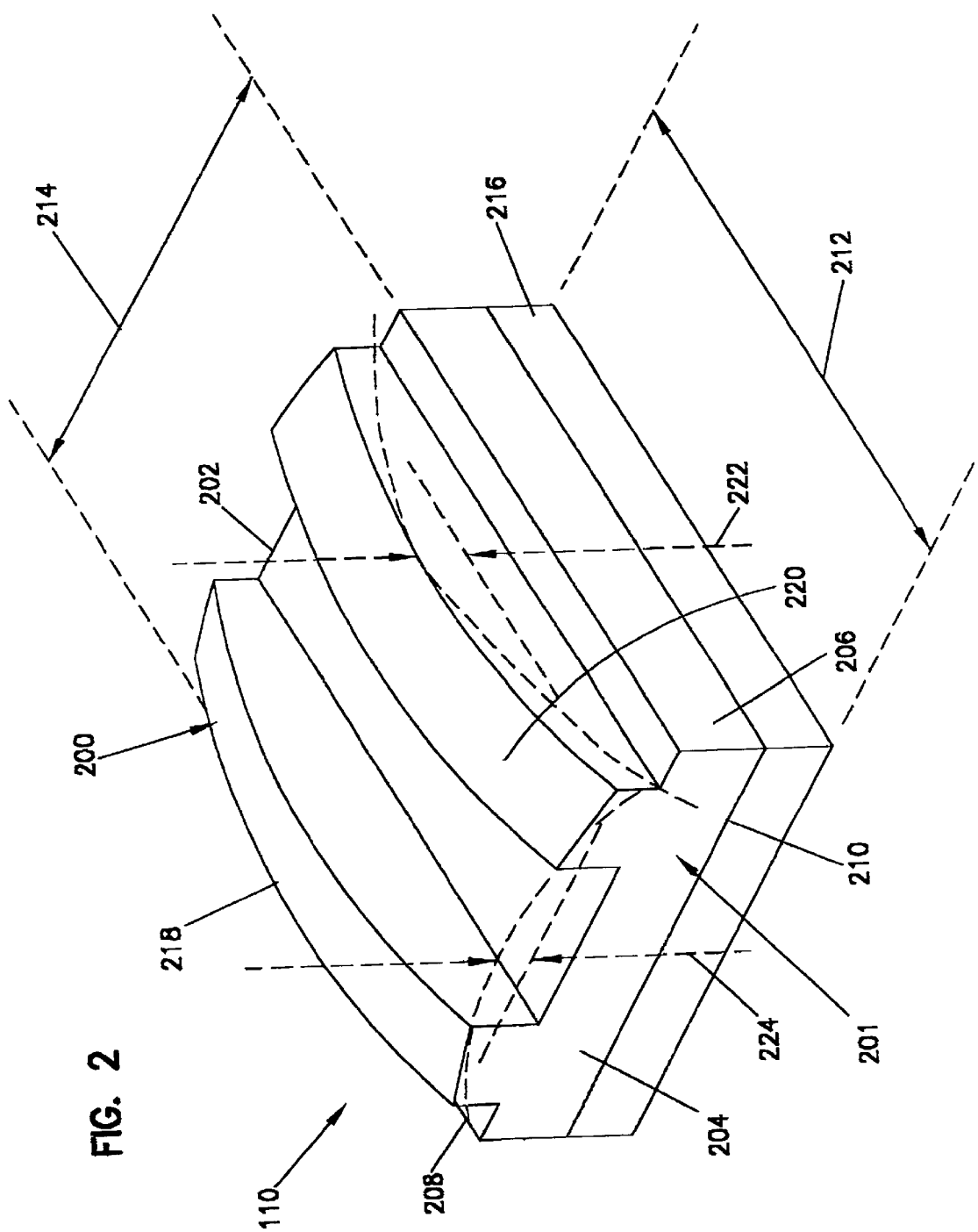
FIG. 2 is a bottom perspective view of a particular disc head slider shown in FIG. 1, as viewed from the surface of a disc.

FIG. 2 is a bottom perspective view of one particular disc head slider 110 of FIG. 1, as viewed from the surface of disc 107. Slider 110 is formed of a substrate having a slider body 201 that includes a leading edge 202, a trailing edge 204, side edges 206 and 208, an air bearing surface 200, and a back surface 210 opposite the air bearing surface 200. Slider body 201 also includes a length 212, measured from leading edge 202 to trailing edge 204, and a width 214, measured from side edge 206 to side edge 208. In the embodiment shown in FIG. 2, air bearing surface 200 includes side rails 218 and 220. However, slider body 201 can include a variety of positive pressure ("PPAB") or negative pressure ("NPAB") bearing surface geometries. These surface geometries can be configured for non-contact, direct-contact or pseudo-contact recording. A read/write transducer (not shown) is typically mounted along trailing edge 204, but can be positioned at other locations on slider body 201 in alternative embodiments. As will be discussed in greater detail in relation to FIG. 3, slider 110 further includes a layer 216 of deformable material attached to back surface 210 of slider body 201.

Slider body 201 illustratively includes a positive curvature on air bearing surface 200 along length 212 and width 214. "Crown" curvature is a measure of the curvature of air bearing surface 200 along length 212. Crown curvature is negative for a concave surface, positive for a convex surface and zero for a flat surface. "Cross" curvature is a measure of the curvature of air bearing surface 200 along width 214. The sign of the cross curvature has the same convention as the sign of the crown curvature. Cross curvature is also known as "camber" curvature. A common method of measuring the crown and cross curvatures is to measure the differences 222 and 224 between the highest points along length 212 and width 214 and the lowest points along length 212 and width 214. Typical crown and cross curvatures are on the order of zero to 1.5 microinches for a "30 series" slider having a length of 49 mils and a width of 39 mils.

Figure 3:
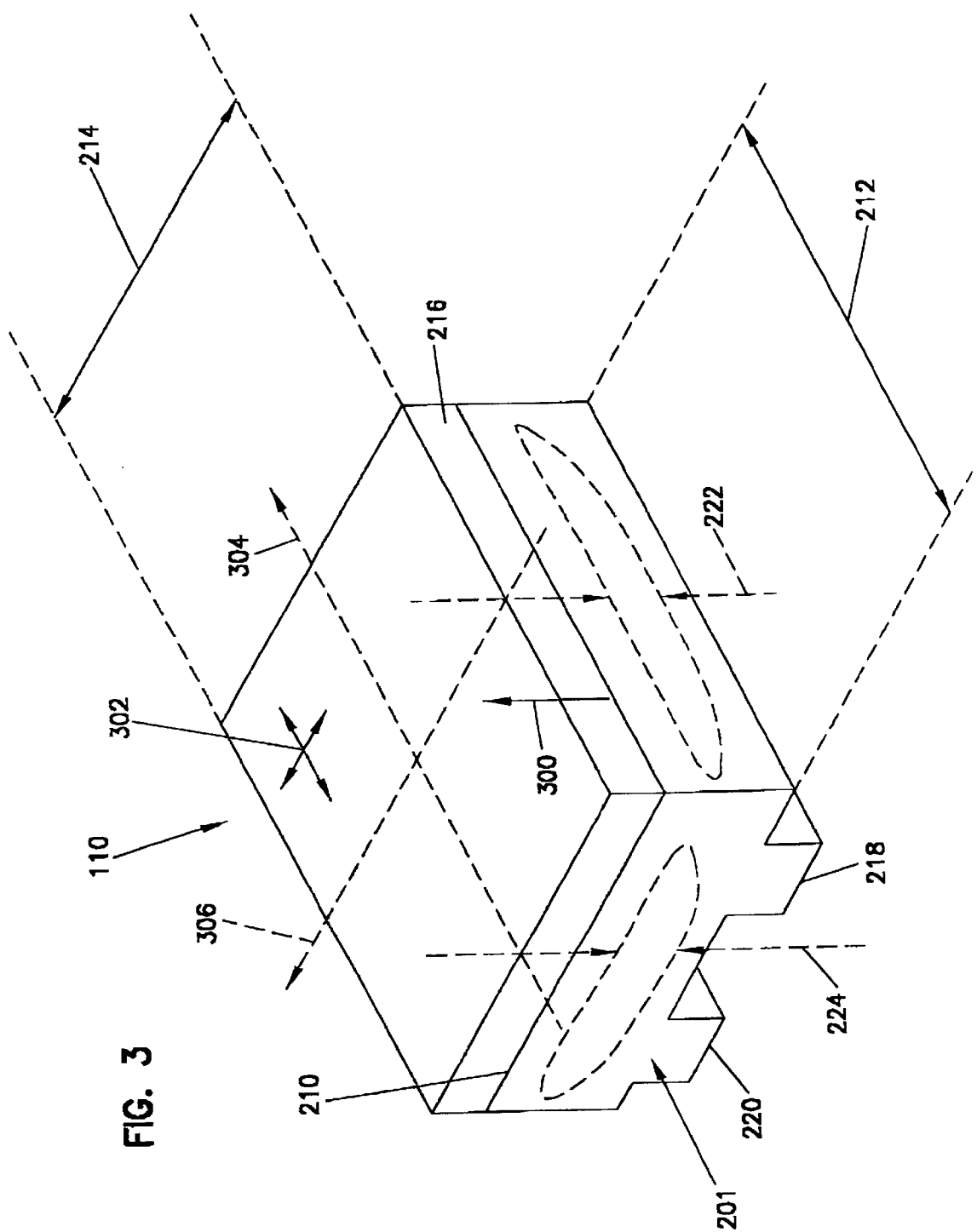
FIG. 3 is a top perspective view of the disc head slider shown in FIG. 2, including an attached layer of deformable material for actively controlling slider crown and cross curvature without de-coupling control of the two curvature types.

FIG. 3 is a top perspective view of the disc head slider 110 shown in FIG. 2. As is illustrated, and as was mentioned above, disc head slider 110 further includes a layer 216 of deformable material attached to back surface 210 of slider body 201. Layer 216 illustratively includes a length and width that respectively and substantially coincide with length 212 and width 214 of slider body 201. Layer 216 enables active control of slider crown and cross curvature without de-coupling control of the two curvature types.

In accordance with one embodiment, layer 216 is constructed of piezoelectric material that deforms in response to an electrical control signal applied thereto. Illustratively, the polarization direction of the piezoelectric deformable layer 216 is up, or in the direction of arrow 300. When a control signal comprising a negative voltage is applied to layer 216, the layer shrinks in a horizontal plane 302 (parallel to back surface 210) producing a bending moment that increases slider crown curvature along a slider body longitudinal axis 304. In addition, the bending moment increases slider cross curvature along a slider body transversal axis 306. These increases in curvature illustratively and respectfully translate into an increase in differences 222 and 224. The direction of the slider deformation is essentially in the direction of arrow 300.

When a control signal comprising a positive voltage is applied to layer 216, the piezoelectric deformable material expands in horizontal plane 302, producing a bending moment that decreases slider crown curvature along longitudinal axis 304. In addition, the bending moment decreases cross curvature along transversal axis 306. These decreases in curvature illustratively and respectfully translate into a decrease in differences 222 and 224. The direction of slider deformation is essentially in a direction opposite of arrow 300.

Slider 110, illustrated in FIGS. 2 and 3, is an example of a slider having a system for actively controlling slider crown and cross curvature, wherein active adjustments made to the two curvature types are coupled. Each change in slider crown curvature, in response to an electrical control signal being applied to layer 216, is necessarily accompanied by a similar change in slider cross curvature, and vice versa. Due to the configuration of layer 216, the quantity of change in each of the crown and cross curvatures, represented by differences 222 and 224, will necessarily be nearly identical (difference 222 will be slightly larger due to length 212 being slightly longer than width 214).

In accordance with an embodiment of the present invention, to de-couple crown and cross curvature actuation, piezoelectric deformable layer 216 (FIGS. 2 and 3) is replaced with a plurality of deformable beams, which, in accordance with one embodiment, are also piezoelectric. Different configurations (i.e., beams are parallel or not parallel) and sizes of beams (i.e., beam length coincides with slider length or is shorter than slider length) will produce different changes in slider crown and cross curvature. Some configurations enable changes in one curvature type to be substantially greater than changes in the other.

In order to compare actuation responses of model sliders incorporating different piezoelectric bar sizes and configurations to the actuation response of a slider model incorporating a single piezoelectric layer (i.e., slider 110), the following sample specifications are maintained. All model sliders include slider bodies that measure 1.25 mm long, 1.00 mm wide and 0.30 mm thick. The glue lines attaching piezoelectric material to slider bodies and their associated suspensions are modeled as elastic material 12.7 microns thick. Suspensions are represented by stainless steel plates 17 microns thick that are attached to piezoelectric material with a layer of glue and clamped along slider body leading edges. Piezoelectric layers are modeled as solid elements with a coupled field component to simulate the piezoelectric-mechanical effects. The excitation or actuation voltage consists of a −25/+25V potential applied across the thickness of piezoelectric material to induce a positive slider body curvature. Before the excitation voltage is applied, crown and cross curvature values are assured to be zero.

Assuming the above specifications and that slider 110 includes a single layer 216 of piezoelectric deformable material approximately 125 microns thick attached to slider body 201, an electrical control signal applied to layer 216 illustratively induces an approximate 0.79 $\mu$in change in slider crown curvature, measured by difference 222. In addition, an approximate 0.48 $\mu$in change in cross curvature, measured by difference 224, is illustratively induced. Due to the coupling of crown and cross curvature actuation within the slider 110 design, the difference between crown change and cross change is small, approximately 0.23 $\mu$in.

Figure 4:
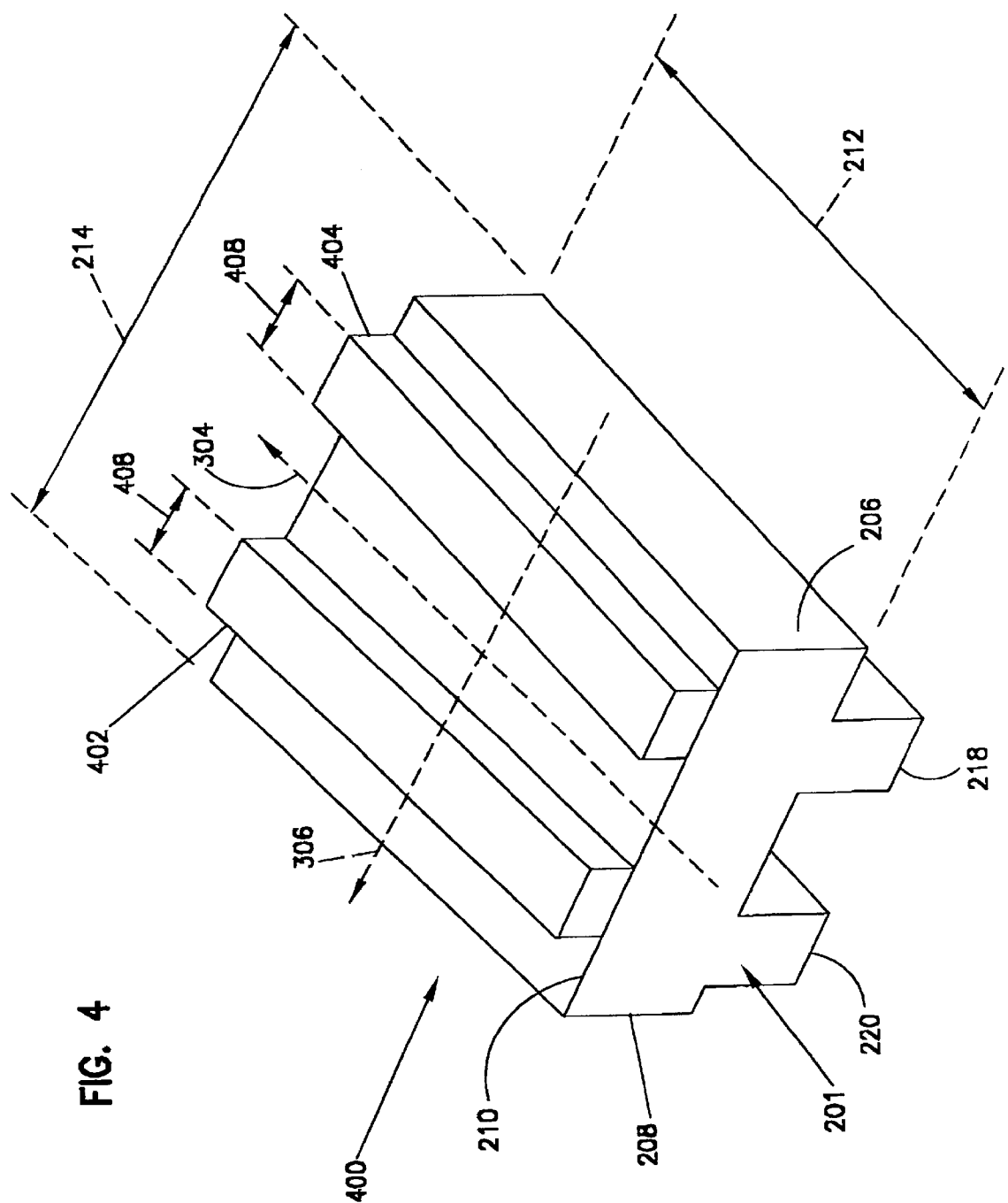
FIG. 4 is a top perspective view of a disc head slider having attached deformable beams for de-coupling active control of crown and cross curvature, according to an embodiment of the present invention.

FIG. 4 is a top perspective view of a slider 400, which is a slider embodiment in which two beams 402 and 404 are constructed of piezoelectric deformable material and affixed to back surface 210 of slider body 201 in a position such that the beams are symmetrically situated about longitudinal axis 304. While the beams are illustrated as being parallel to one another and to longitudinal axis 304, such a parallel configuration is but one embodiment that falls within the scope of the present invention. The same reference numbers are used in FIG. 4 for elements that are the same or similar to those elements illustrated in previously described embodiments. Beams 402 and 404 are not aligned with edges 206 and 208 of slider body 201, but instead are substantially centered in each half of back surface 210. Beams 402 and 404 each include a width 408 and a length that substantially coincides with length 212 of slider body 201.

Table 1 shows actuation results for several embodiments of slider 400 having different sets of beams with different width 408 values. As is illustrated in FIG. 4, the beams are substantially centered within each half of width 214 of slider body 201 and not aligned with edges 206 and 208. Table 1 also compares the resulting changes in slider crown and cross curvature with changes consistent with actuation of a single piezoelectric layer configuration, described above in relation to FIGS. 2 and 3.

TABLE 1

| Beam Width (Width 408) | Change In Crown ($\mu$in) | Change In Cross ($\mu$in) | % Slider 110 Crown | % Slider 110 Cross |
|---|---|---|---|---|
| Slider 110 (Single Layer) | 0.79 | 0.48 | | |
| 0.45 mm | 0.72 | 0.24 | −9.65 | −49.80 |
| 0.40 mm | 0.66 | 0.19 | −17.13 | −61.04 |
| 0.35 mm | 0.59 | 0.13 | −25.12 | −72.00 |
| 0.30 mm | 0.53 | 0.09 | −33.69 | −82.10 |

These actuation results indicate that embodiments consistent with the centered beam configuration (generally depicted in FIG. 4) produce reductions in slider cross curvature with relatively small decreases in slider crown curvature, as compared to the single layer embodiment consistent with FIGS. 2 and 3. Closer examination of the results also reveals that force concentrations of the piezoelectric deformable beams do not introduce local distortions in the slider air bearing surface curvatures.

Figure 5:
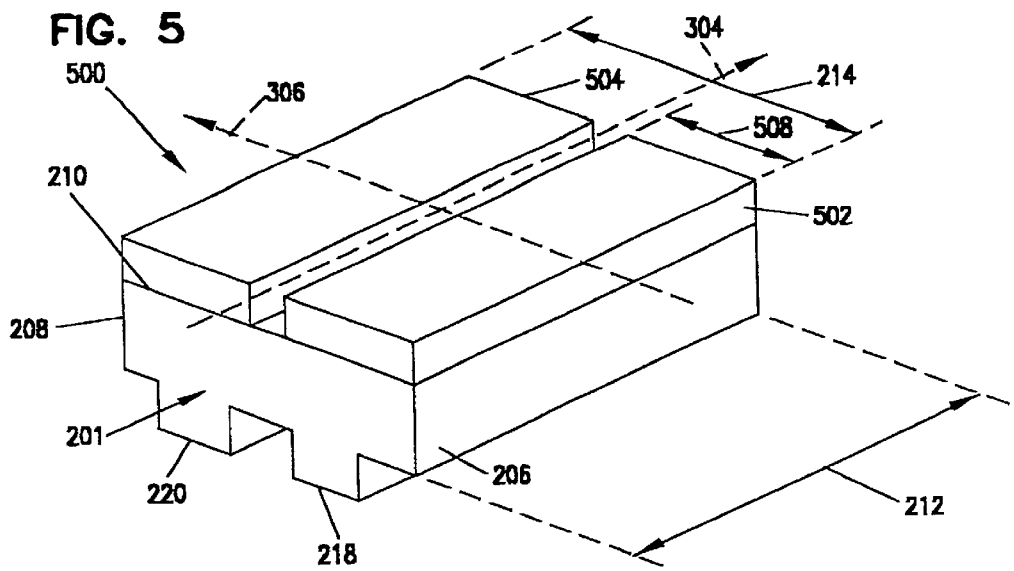
FIG. 5 is a top perspective view of a disc head slider having attached deformable beams aligned with a slider edge, for de-coupling active control of crown and cross curvature, according to an embodiment of the present invention.

FIG. 5 is a top perspective view of a slider 500, which is a slider embodiment in which two illustratively parallel beams 502 and 504 are constructed of piezoelectric deformable material and affixed to back surface 210 of slider body 201 in a position such that the beams are symmetrically situated about a longitudinal axis 304. The same reference numbers are used in FIG. 5 for elements that are the same or similar to those elements illustrated in previously described embodiments. Beams 502 and 504, in accordance with this embodiment, are substantially aligned with edges 206 and 208 of slider body 201. Beams 502 and 504 each include a width 508 and a length that substantially coincides with length 212.

Table 2 shows actuation results for several embodiments of slider 500 having different sets of beams with different width 508 values. As is illustrated in FIG. 5, the beams are substantially aligned with edges 206 and 208 of slider body 201. Table 2 also compares the resulting changes in slider crown and cross curvature with changes consistent with actuation of a single piezoelectric layer configuration, described above in relation to FIGS. 2 and 3.

TABLE 2

| Beam Width (Width 408) | Change In Crown ($\mu$in) | Change In Cross ($\mu$in) | % Slider 110 Crown | % Slider 110 Cross |
|---|---|---|---|---|
| Slider 110 (Single Layer) | 0.79 | 0.48 | | |
| 0.45 mm | 0.73 | 0.22 | −8.26 | −53.11 |
| 0.40 mm | 0.68 | 0.16 | −14.35 | −65.66 |
| 0.35 mm | 0.63 | 0.11 | −20.39 | −76.73 |
| 0.30 mm | 0.58 | 0.06 | −26.47 | −88.48 |

These actuation results indicate that embodiments consistent with the edge aligned beam configuration (generally depicted in FIG. 5) produce an increase in the change in crown curvature with a simultaneous decrease in the change in cross curvature, as compared to the centered beam configuration generally depicted in FIG. 4. Overall, the FIG. 5 configuration improves upon the FIG. 4 configuration in producing additional reductions in slider cross curvature with relatively small decreases in slider crown curvature, as compared to the single layer embodiment consistent with FIGS. 2 and 3. Beam width, in both embodiments, can be selected to provide different degrees of curvature change for a given voltage.

It should be noted that while FIGS. 4 and 5 illustrate piezoelectric deformable beams affixed to the back surfaces of slider bodies so that each beam is positioned parallel to a slider body longitudinal axis, the beams could just as easily be positioned parallel to, and symmetrically situated to, a slider body transversal axis, such as axis 306 in FIGS. 4 and 5. In this case, in accordance with one embodiment, the length of the beams would substantially coincide with slider width 214 and the actuation response of the deformable beams would be such that more change would occur in slider cross curvature than crown curvature, rather than vice versa. In addition, it should also be pointed out that each individual piezoelectric deformable beam could be replaced with a plurality of substantially dissociated beams without departing from the scope of the current invention. In accordance with one embodiment, multiple narrow beams are substituted for wider beams to enable a fine tuning of actuation within a desired range of curvature actuation.

It should also be pointed out that while FIGS. 4 and 5 illustrate piezoelectric deformable beams affixed to the back surfaces of slider bodies so that each beam corresponds to length 212, the beams could just as easily be shorter than length 212. In other words, it is not critical to the current invention that the lengths of the beams coincide with any particular slider measurement. Neither it is critical that the beams be the same length. In addition, while FIGS. 4 and 5 illustrate piezoelectric deformable beams that are parallel to each other and parallel to axis 304, the beams could just as easily be situated in non-parallel configurations wherein the beams are not parallel to axis 304, to axis 306 or to one another.

Figure 6:
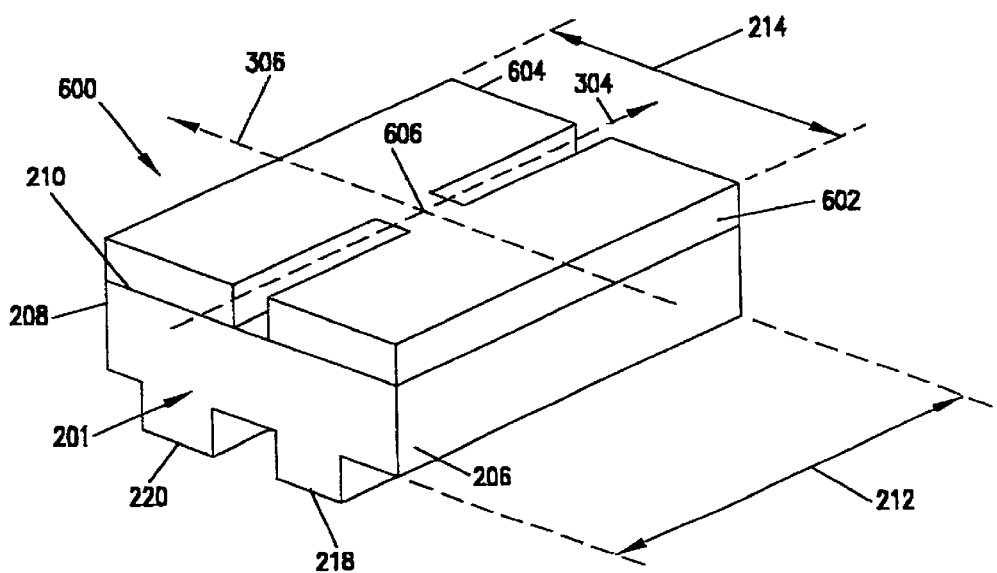
FIG. 6 is a top perspective view of a disc head slider having attached deformable beams that are connected by a bridge structure, according to an embodiment of the present invention.

FIG. 6 is similar to FIG. 5 and is a top perspective view of a slider embodiment in which slider 600 includes two parallel beams 602 and 604 constructed of piezoelectric deformable material. The same reference numbers are used in FIG. 6 for elements that are the same or similar to those elements illustrated in previously described embodiments. Beams 602 and 604 are affixed to back surface 210 of slider body 201 in a position such that the beams are symmetrically situated about a slider longitudinal axis 304 and aligned with side edges 206 and 208. In contrast to the FIG. 5 slider embodiment, slider 600 further includes bridge structure 606. Bridge structure 606 connects beam 602 to beam 604, thereby creating a single piece for attachment to a slider rather than two separate pieces. Accordingly, bridge structure 606 simplifies assembly of slider 600. It should be noted that a bridge structure similar to bridge structure 606 could be utilized to connect beams within any of the embodiments of the present invention without departing from the scope of the invention.

Figure 7:
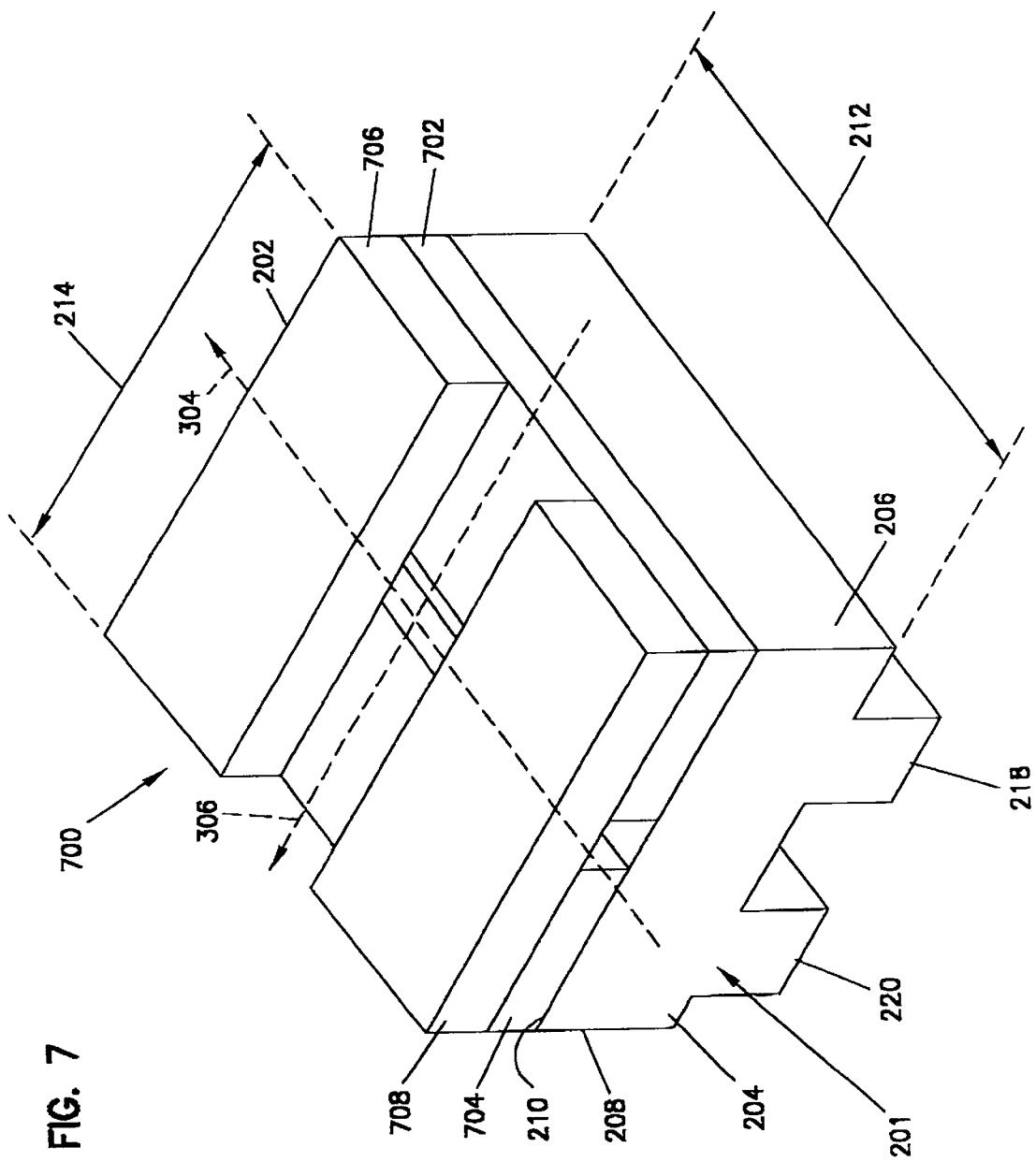
FIG. 7 is a top perspective view of a disc head slider having two layers of attached deformable beams for de-coupling active control of crown and cross curvature, according to an embodiment of the present invention.

FIG. 7 is a top perspective view of a slider 700, which is a slider embodiment in which a first pair of beams, namely beams 702 and 704, are constructed of piezoelectric deformable material and affixed to back surface 210 of slider body 201 in a position such that the beams are symmetrically situated about longitudinal axis 304. The same reference numbers are used in FIG. 7 for elements that are the same or similar to those elements illustrated in previously described embodiments. A second pair of beams, namely beams 706 and 708, are constructed of piezoelectric deformable material and affixed to the first plurality of beams in a position such that the second pair of parallel beams are symmetrically situated about transversal axis 306 of slider body 201. Beams 702 and 704 illustratively include a length that substantially coincides with length 212 of slider body 201 and are aligned with edges 206 and 208. Beams 706 and 708 illustratively include a length that substantially coincides with width 214 of slider body 201 and are aligned with slider leading edge 202 and trailing edge 204. Each of the four beams is deformable in response to an electrical control signal.

In accordance with one embodiment, the two beam pairs can be provided with opposite polarizations in order to initiate deformation of the first and second pair of beams in substantially opposite directions. In accordance with another embodiment, each beam pair can be actuated individually, so as to enable slider crown and cross curvature to be actuated separately.

In accordance with yet another embodiment, the beams can be configured so that each beam pair incorporates piezoelectric deformable material configured to actuate slider crown and cross curvatures in opposite directions in reaction to a single control signal. Table 3 shows actuation results for slider 700 including beams with 0.45 mm widths. As is illustrated in FIG. 7, the beams are substantially aligned with the slider body edges. Table 2 also compares the resulting changes in slider crown and cross curvature with changes consistent with actuation of a single piezoelectric layer configuration, described above in relation to FIGS. 2 and 3.

TABLE 3

| Beam Width | Change In Crown ($\mu$in) | Change In Cross ($\mu$in) | % Slider 110 Crown | % Slider 110 Cross |
|---|---|---|---|---|
| Slider 110 (Single Layer) | 0.79 | 0.48 | | |
| 0.45 mm | 0.61 | −0.21 | −23.30 | −143.55 |

These actuation results assume an embodiment consistent with the FIG. 7 configuration and having beam pairs with oppositely oriented piezoelectric material that responds to a single electric control signal. As the table illustrates, this embodiment produces reductions in slider cross curvature with a significant increase in slider crown curvature, as compared to the single layer embodiment consistent with FIGS. 2 and 3.

It should be pointed out that the width of beams incorporated into the FIG. 7 embodiment could be selected to provide desired degrees of curvature change for a given voltage. In addition, the configuration of the beams could also be selected, and in particular, beams could be centered (similar to FIG. 4) instead of aligned with the slider edges, to provide different degrees of curvature change for a given control signal voltage. Also, each beam in the FIG. 7 embodiment could be substituted with a plurality of individual beams. More than two layers of beams could be utilized to provide desired curvature change for a given control signal voltage. Non-parallel beam sets could be utilized. Beams having lengths that do not coincide with any particular slider measurement could be utilized. Finally, a bridge structure similar to bridge structure 606 in FIG. 6 could be utilized to connect any and all beams within a particular layer of beams. All of these adjustments could be made without departing from the scope of the present invention.

In accordance with other embodiments of the current invention, single layers of piezoelectric material with anisotropic deformation properties are substituted for beam pairs to enable slider curvature actuation results similar to those discussed above in relation to other embodiments. The anisotropic properties of the piezoelectric material may be created during fabrication of the material to preferentially orient the material structure or enhance the piezo-mechanical coupling in a directional way via composition. Anisotropic properties could be selected and incorporated into any number of layers of piezoelectric material in order to simulate any of the above described piezoelectric bar configurations.

Figure 8:
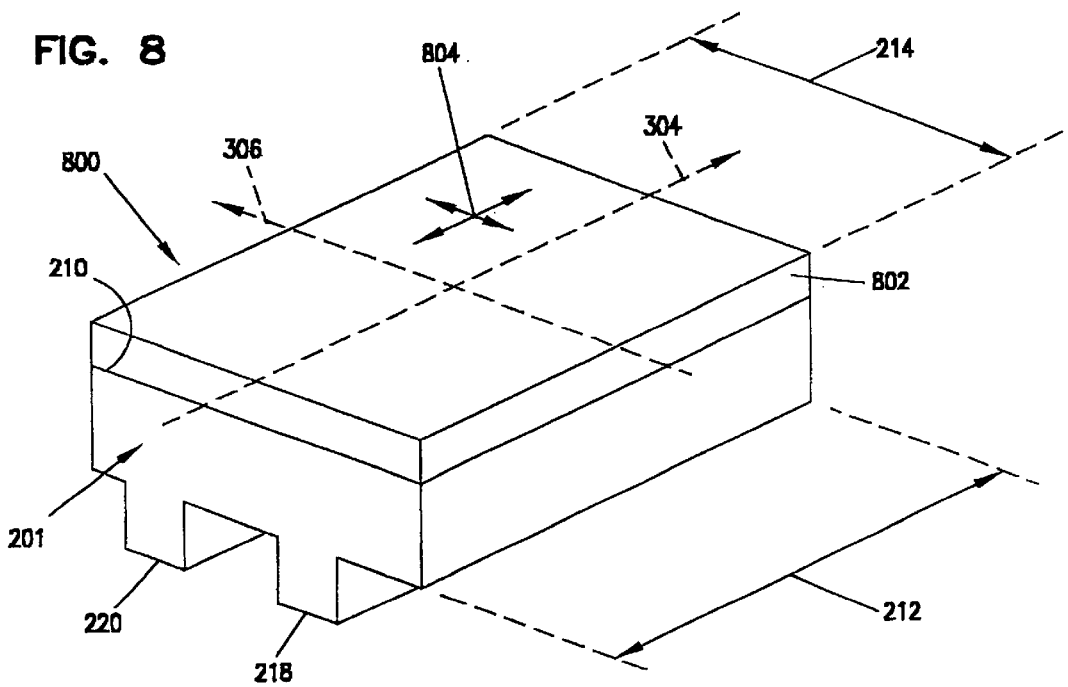
FIG. 8 is a top perspective view of a disc head slider having an attached layer of anisotropic, piezoelectric, deformable material for de-coupling active control of crown and cross curvature, according to an embodiment of the present invention.

FIG. 8 is a top perspective view of a slider 800 in accordance with an embodiment of the present invention. The same reference numbers are used in FIG. 8 for elements that are the same or similar to those elements illustrated in previously described embodiments. Slider 800 includes a layer 802 of deformable anisotropic material affixed to back surface 210 of slider body 201. Layer 802 includes a length and width that respectively and substantially coincide with length 212 and width 214 of slider body 201. In accordance with this embodiment, the deformable anisotropic material that makes up layer 802 is fabricated so that a dimensional change that occurs in response to an electrical control signal being applied thereto is in a horizontal plane 804 which is parallel to back surface 210. In addition, the dimensional change is to a greater extent along one of longitudinal axis 304 and transversal axis 306 than the other. Deformation of layer 802 in response to an electrical control signal enables a change in one of the slider scrown and cross curvature to a greater extent than the other. In other embodiments, the material within layer 802 is fabricated to enable deformation similar to deformation caused by the single beam layer embodiments discussed above in relation to FIGS. 4 and 5. The size and orientation of beam-like zones within layer 802 can be selected to provide desired degrees of curvature change for a given voltage.

Figure 9:
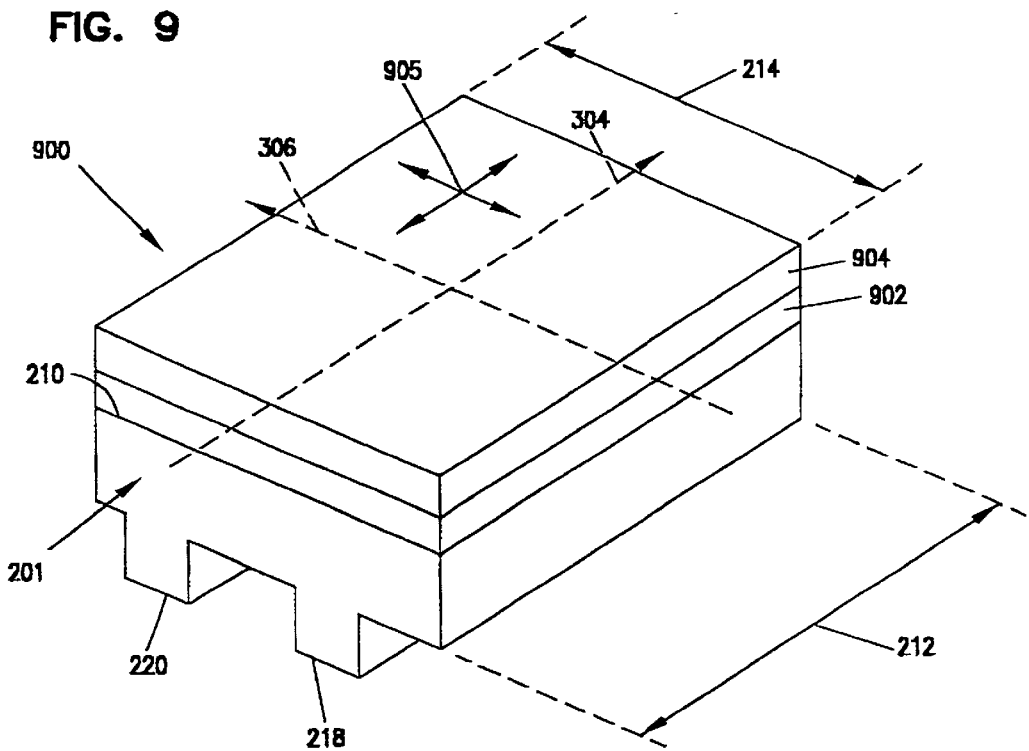
FIG. 9 is a top perspective view of a disc head slider having two layers of attached anisotropic, piezoelectric, deformable material for de-coupling active control of crown and cross curvature, according to an embodiment of the present invention.

FIG. 9 is a top perspective view of a slider 900 in accordance with an embodiment of the present invention. Slider 900 includes layers 902 and 904 of deformable anisotropic material affixed to each other and to back surface 210 of slider body 201. Layers 902 and 904 each include a length and width that respectively and substantially coincide with length 212 and width 214 of slider body 201. In accordance with the FIG. 9 embodiment, the deformable anisotropic material that makes up layers 902 and 904 is fabricated so that a dimensional change, experienced by either or both layer in response to an electrical control signal being applied to either or both layers, is in a horizontal plane 905 which is parallel to back surface 210. In addition, within each layer, the dimensional change is to a greater extent along one of longitudinal axis 304 and transversal axis 306 than the other. In accordance with one embodiment, the anisotropic material is fabricated so that dimensional changes that occur within each layer in response to an electrical control signal are in substantially opposite directions. Deformation of layer 904 in response to an electrical control signal, in combination with deformation of layer 902 in response to the same or different control signal, enables a change in one of the slider crown and cross curvature to a greater extent than the other. In other embodiments, the material within layers 902 and 904 is fabricated to enable deformation similar to deformation caused by the multi-beam layer embodiments discussed above in relation to FIG. 7. The size and orientation of beam-like zones within layer 802 can be selected to provide desired degrees of curvature change for a given voltage.

The present invention also pertains to methods of manufacturing piezoelectric transducers that, as described above in relation to previous embodiments, are attached to a back surface of a slider via adhesive or other bonding methods. The methods, in some respects, are similar to the differential die process described in U.S. Pat. No. 6,118,637, herein incorporated by reference, wherein dice lanes and isolation trenches on the piezoelectric transducer are formed with two separate photolithography masks. It should be noted that the manufacturing methods described in detail below are but examples of how piezoelectric transducers suitable for incorporation into the slider fly height control of the present invention could be produced. Methods of manufacture other than those described could be utilized without departing from the scope of the invention.

One aspect of the present invention pertains to a method for fabricating single layer piezoelectric devices from a wafer with electrical contacts deposited on the surface. In accordance with the method, polarized wafers of piezoelectric material with gold electrodes are first obtained, and mounted to UV release tape in a frame. Then, photoresist is coated on the exposed surface, and isolation trenches and die lanes are patterned thereon via curing the resist with a mask-based photolithography process. Gold and nickel/chromium are wet etched in the unprotected areas, where the photoresist was not cured and removed during subsequent cleaning. Then, the isolation trenches are diced with a tapered blade on the leading edge of each row of piezolectric elements. The photoresist process is repeated with a different mask to protect the existing electrode, isolation area, and piezoelectric surfaces, so that Nickel/chromium and gold can be sputtered onto the beveled surface of the isolation trench, forming a connection for the lower electrode on the top surface. The photoresist is stripped off, and the bars are cleaned and diced into single devices from the wafer. Electrical impedance tests can then be performed on the diced bars to validate electrode connection and piezo-mechanical properties. Next, the piezoelectric transducer bars are placed in a tray and eventually attached to a bar of sliders via an epoxy, Sol Gel, or other bonding agent. Finally, the sliders are diced into separate devices and placed in a tray for eventual integration with a suspension.

In accordance with the present invention, embodiments of the fly height control slider that incorporate multi-element and multi-layer designs require a method with steps in addition to those described above to form the associated shapes and to maintain alignment during fabrication. The more complex shapes require a modified process to form the proper geometry. In accordance with one embodiment, if the piezoelectric material is processed in accordance with the method described above and diced into bars, the bars are transferred to a transport wafer from the dice frame, and cut with a single or ganged saw to form multiple elements. The array of devices are then bonded to bars of sliders, and then released from the transport wafer that maintains the alignment of the piezoelectric elements. Other methods for forming such shapes, that would represent variations on the original embodiment, involve a precise cutting method, such as a laser focussed ion beam or a water jet, to slice the wafer into the desired pattern. Another alternative would be to attach the piezoelectric wafer to a transport wafer and use an ion or reactive ion process to preferentially remove the piezoelectric material to form the shape. Finally, the piezoelectric material can be sputter deposited as a film onto a substrate, provided a suitable resist is used to control the deposition process.

In accordance with the present invention, for embodiments with two layers, each layer may be fabricated as described above, while attached to a transport wafer. The two composite wafers are joined with a conductive bond, piezoelectric material to piezoelectric material, and then released from the second transport wafer to form the final devices. Depending on the desired method for driving the piezoelectric elements, a non-conductive bond may be used to isolate the conductors facing each other. Once diced into bars and bonded to the sliders in bar form, the second transport wafer is released. An alternative to the above embodiment would be to form the elements of one layer directly on the bar of sliders without a secondary transport wafer via a deposition scheme. An intermediate fill material may be used to provide support for the second layer of piezoelectric material over the regions that do not include piezoelectric material in the first layer. This fill would be removed once deposition of all the piezoelectric material is completed.

In summary, one aspect of the present invention pertains to slider 400, 500, 600 and 700 for actively controlling a fly height of the sliders 400, 500, 600 and 700 relative to a data storage disk 107. Sliders 400, 500, 600 and 700 each include a slider body 201 having an air bearing surface 200, a back surface 210 opposite the air bearing surface 200, a length 212, a width 214, a longitudinal axis 304, a transversal axis 306, a crown curvature 222 located on the air bearing surface 200 along the length 212 of the slider body 201 and a cross curvature 224 located on the air bearing surface 200 along the width 214 of the slider body 201. A first plurality of beams, respectfully beams 402 and 404, 502 and 504, 602 and 604, and 702, 704, 706 and 708, that are disassociated from one another, constructed of deformable material and affixed to the back surface 210 of the slider body 201. Each beam 402, 404, 502, 504, 602, 604, 702, 704, 706 and 708 within the first plurality of beams is parallel to one of the longitudinal axis 304 and transversal axis 306 and is deformable in response to an applied electrical control signal.

Another aspect of the present invention pertains to slider 800 and 900 for actively controlling a fly height of sliders 800 and 900 relative to a data storage disc 107. Sliders 800 and 900 each include a slider body 201 having an air bearing surface 200, a back surface 210 opposite the air bearing surface 200, a length 212, a width 214, a longitudinal axis 304, a transversal axis 306, a crown curvature 222 located on the air bearing surface 200 along the length 212 of the slider body 201 and a cross curvature 224 located on the air bearing surface 200 along the width 214 of the slider body 201. A first layer of deformable anisotropic material is affixed to the back surface 210 of the slider body 201 and includes a length and width that respectively and substantially coincide with length 212 and width 214 of the slider body 201.

Another aspect of the present invention pertains to a disc drive, which includes a disc 107 that is rotatable about a central axis 109 and has a recording surface. The disc drive also includes a disc head slider 110, 400, 500, 600, 700, 800 and 900 for carrying a transducer at a fly height relative to the recording surface during rotation of the disc 107 and for actively altering at least one of a crown curvature 222 and a cross curvature 224 of the disc head slider 110, 400, 500, 600, 700, 800 and 900 to a greater extent than the other of the crown curvature 222 and cross curvature 224 to adjust the fly height during rotation of the disc 107.

It is to be understood that even though numerous characteristics and advantages of various embodiments of the invention have been set forth in the foregoing description, together with details of the structure and function of various embodiments of the invention, this disclosure is illustratively only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive while maintaining substantially the same functionality without departing from the scope and spirit of the present invention. In addition, although the preferred embodiment described herein is directed to a fly height control slider with crown and cross curve de-coupling for a disc drive system, it will be appreciated by those skilled in the art that the teaching of the present invention can be applied to other types of sliders, such as a positive pressure slider having no cavity dam and sliders having different numbers of rails and rail shapes without departing from the scope and spirit of the present invention. Also, the present invention can be used with any type of ramp load-unload or contact start-stop suspension, such as rotary and linear suspensions, and the transducing head can be of any type such as magnetic, magneto-resistive, optical or magneto-optical, for example.

What is claimed is:

1. A slider for actively controlling a fly height of the slider relative to a data storage disc, the slider comprising:
    a slider body having an air bearing surface, a back surface opposite the air bearing surface, a length, a width, a longitudinal axis, a transversal axis, a crown curvature located on the air bearing surface along the length of the slider body and a cross curvature located on the air bearing surface along the width of the slider body; and
    a first plurality of beams that are disassociated from one another, constructed of deformable material and affixed to said back surface of the slider body, wherein each beam within the first plurality of beams, in response to an applied electrical control signal, is deformable in a first dimension parallel to the back surface of the slider body, wherein a deformation of the first plurality of beams induces a change in one of the crown and cross curvature to a greater extent than the other of the crown and cross curvature.

2. The slider of claim 1 and further including a bridge structure attached to each beam within the first plurality of beams.

3. The slider of claim 1 wherein the first plurality of beams are substantially parallel to one another and substantially parallel to one of the longitudinal and transversal axes.

4. The slider of claim 3 wherein said first plurality of beams comprises:
    a first pair of parallel beams, wherein each beam within said first pair of parallel beams is positioned symmetrically from the other with respect to one of the longitudinal and transversal axes of the slider body.

5. The slider of claim 4 wherein each beam within said first pair of parallel beams includes a length that coincides with one of the length of the slider body and the width of the slider body.

6. The slider of claim 1 and further including a second plurality of beams that are disassociated from one another, constructed of deformable material and affixed to said first plurality of beams, wherein each beam within said second plurality of beams, in response to an applied electrical control signal, is deformable in a second dimension substantially parallel to the back surface of the slider body.

7. The slider of claim 6 and further including a bridge structure attached to each beam within at least one of the first and second plurality of beams.

8. The slider of claim 6 wherein each beam within the first plurality of beams is deformable to a greater extent along one of the longitudinal and transversal axes, and wherein each beam within the second pair of parallel beams is deformable to a greater extent along the other of the longitudinal and transversal axes, and wherein a deformation of the second plurality of beams, in combination with a deformation of the first plurality of beams, induces a change in one of the crown and cross curvature to a greater extent than the other of the crown and cross curvature.

9. The slider of claim 8 wherein said first plurality of beams comprises a first pair of parallel beams, and said second plurality of beams comprises a second pair of parallel beams, wherein each beam within said first pair of parallel beams is positioned symmetrically from the other with respect to one of the longitudinal and transversal axes, wherein each beam within said second pair of parallel beams is positioned symmetrically from the other with respect to the other of the longitudinal and transversal axes, and wherein the second pair of parallel beams is affixed to the first pair of parallel beams such that said first and said second pair of parallel beams are positioned substantially perpendicular to one another.

10. The slider of claim 9 wherein each beam within each of the first and second pair of parallel beams includes a length that coincides with one of the length and width of the slider body.

11. A slider for actively controlling a fly height of the slider relative to a data storage disc, the slider comprising:
    a slider body having an air bearing surface, a back surface opposite the air bearing surface, a length, a width, a longitudinal axis, a transversal axis, a crown curvature located on the air bearing surface along the length of the slider body and a cross curvature located on the air bearing surface, along the width of the slider body; and
    a first layer of deformable, anisotropic material affixed to said back surface of the slider body and having a length and width that respectively and substantially coincide with said length and width of the slider body, wherein the first layer is deformable in response to an electrical control signal being applied thereto, and wherein a deformation of the first layer induces a change in one of the crown and cross curvature to a greater extent than the other of the crown or cross curvature.

12. The slider of claim 11 and further including a second layer of deformable anisotropic material having a length and width that respectively and substantially coincide with said length and said width of the slider body, wherein said second layer of deformable material is affixed to said first layer of deformable anisotropic material.

13. The slider of claim 12 wherein the second layer is fabricated so that a dimensional change that occurs in the deformable anisotropic material in response to an electrical control signal being applied thereto is in a plane substantially parallel to the back surface of the slider body to a greater extent along one of the longitudinal and transversal axes than along the other of the longitudinal and transversal axes, and wherein a deformation of the second layer of deformable material, in combination with a deformation of the first layer of deformable material, induces a change in one of the crown and cross curvature to a greater extent than the other of the crown and cross curvature.

14. A disc drive comprising:
    a disc rotatable about a central axis and having a recording surface; and
    disc head slider means for carrying a transducer at a fly height relative to the recording surface during rotation of the disc and for actively altering at least one of a crown curvature and cross curvature of the disc head slider to a greater extent than the other of the crown and cross curvatures to adjust the fly height during rotation of the disc.

15. A slider for actively controlling a fly height of the slider relative to a data storage disc, the slider comprising:

a slider body having an air bearing surface, a back surface opposite the air bearing surface, a length, a width, a longitudinal axis, a transversal axis, a crown curvature located on the air bearing surface along the length of the slider body and a cross curvature located on the air bearing surface along the width of the slider body; and a first plurality of beams that are disassociated from one another, constructed of deformable material and affixed to said back surface of the slider body, wherein each beam within the first plurality of beams, in response to an applied electrical control signal, is deformable in a first dimension parallel to the back surface of the slider body, wherein the first plurality of beams is deformable to a greater extent along one of the longitudinal and transversal axes than along the other of the longitudinal and transversal axes, and wherein a deformation of the first plurality of beams induces a change in one of the crown and cross curvature to a greater extent than the other of the crown and cross curvature.

16. The slider of claim 15 wherein the first plurality of beams are substantially parallel to one another and substantially parallel to one of the longitudinal and transversal axes.

17. The slider of claim 16 wherein said first plurality of beams comprises:

a first pair of parallel beams, wherein each beam within said first pair of parallel beams is positioned symmetrically from the other with respect to one of the longitudinal and transversal axes of the slider body.

18. The slider of claim 17 wherein each beam within said first pair of parallel beams includes a length that coincides with one of the length of the slider body and the width of the slider body.

19. A slider for actively controlling a fly height of the slider relative to a data storage disc, the slider comprising:

a slider body having an air bearing surface, a back surface opposite the air bearing surface, a length, a width, a longitudinal axis, a transversal axis, a crown curvature located on the air bearing surface along the length of the slider body and a cross curvature located on the air bearing surface along the width of the slider body;

a first plurality of beams that are disassociated from one another, constructed of deformable material and affixed to said back surface of the slider body, wherein each beam within the first plurality of beams, in response to an applied electrical control signal, is deformable in a first dimension parallel to the back surface of the slider body; and a second plurality of beams that are disassociated from one another, constructed of deformable material and affixed to said first plurality of beams, wherein each beam within said second plurality of beams, in response to an applied electrical control signal, is deformable in a second dimension substantially parallel to the back surface of the slider body.

20. The slider of claim 19 and further including a bridge structure attached to each beam within at least one of the first and second plurality of beams.

21. The slider of claim 19 wherein each beam within the first plurality of beams is deformable to a greater extent along one of the longitudinal and transversal axes, and wherein each beam within the second pair of parallel beams is deformable to a greater extent along the other of the longitudinal and transversal axes, and wherein a deformation of the second plurality of beams, in combination with a deformation of the first plurality of beams, induces a change in one of the crown and cross curvature to a greater extent than the other of the crown and cross curvature.

22. The slider of claim 21 wherein said first plurality of beams comprises a first pair of parallel beams, and said second plurality of beams comprises a second pair of parallel beams, wherein each beam within said first pair of parallel beams is positioned symmetrically from the other with respect to one of the longitudinal and transversal axes, wherein each beam within said second pair of parallel beams is positioned symmetrically from the other with respect to the other of the longitudinal and transversal axes, and wherein the second pair of parallel beams is affixed to the first pair of parallel beams such that said first and said second pair of parallel beams are positioned substantially perpendicular to one another.

23. The slider of claim 22 wherein each beam within each of the first and second pair of parallel beams includes a length that coincides with one of the length and width of the slider body.

24. A slider for actively controlling a fly height of the slider relative to a data storage disc, the slider comprising:

a slider body having an air bearing surface, a back surface opposite the air bearing surface, a length, a width, a longitudinal axis, a transversal axis, a crown curvature located on the air bearing surface along the length of the slider body and a cross curvature located on the air bearing surface, along the width of the slider body;

a first layer of deformable, anisotropic material affixed to said back surface of the slider body and having a length and width that respectively and substantially coincide with said length and width of the slider body, wherein the first layer of deformable anisotropic material is piezoelectric and is fabricated so that a dimensional change that occurs in the first layer in response to an electrical control signal being applied thereto is in a plane substantially parallel to the back surface of the slider body to a greater extent along one of the longitudinal and transversal axes than along the other of the longitudinal and transversal axes, and wherein a deformation of the first layer induces a change in one of the crown and cross curvature to a greater extent than the other of the crown and cross curvature; and a second layer of deformable anisotropic material having a length and width that respectively and substantially coincide with said length and said width of the slider body, wherein said second layer of deformable material is affixed to said first layer of deformable anisotropic material.

25. The slider of claim 24 wherein the second layer is fabricated so that a dimensional change that occurs in the deformable anisotropic material in response to an electrical control signal being applied thereto is in a plane substantially parallel to the back surface of the slider body to a greater extent along one of the longitudinal and transversal axes than along the other of the longitudinal and transversal axes, and wherein a deformation of the second layer of deformable material, in combination with a deformation of the first layer of deformable material, induces a change in one of the crown and cross curvature to a greater extent than the other of the crown and cross curvature.

* * * * *